(No Model.)

M. SCHNEIDER.
BREAD CUTTER.

No. 304,459.  Patented Sept. 2, 1884.

Witnesses:
Jos. Rosenbaum.
Sidney Mann.

Inventor:
Max Schneider
by Gospel & Raegener
Attorneys.

UNITED STATES PATENT OFFICE.

MAX SCHNEIDER, OF BERLIN, GERMANY, ASSIGNOR TO FRANZ GLINICKE, OF SAME PLACE.

BREAD-CUTTER.

SPECIFICATION forming part of Letters Patent No. 304,459, dated September 2, 1884.

Application filed April 19, 1884. (No model.)

*To all whom it may concern:*

Be it known that I, MAX SCHNEIDER, of Berlin, in the Kingdom of Prussia, German Empire, have invented certain new and useful Improvements in Bread-Cutting Machines, of which the following is a specification.

This invention has reference to an improved bread-cutting machine in which a clean cut is imparted to the cutting-knife throughout its entire movement; and the invention consists of a base-block and a curved knife, an oscillating lever pivoted to the knife and the base-block, a toothed segment secured to the pivoted end of the knife, and a segmental rack attached to the end of the base-block.

Figure 1:
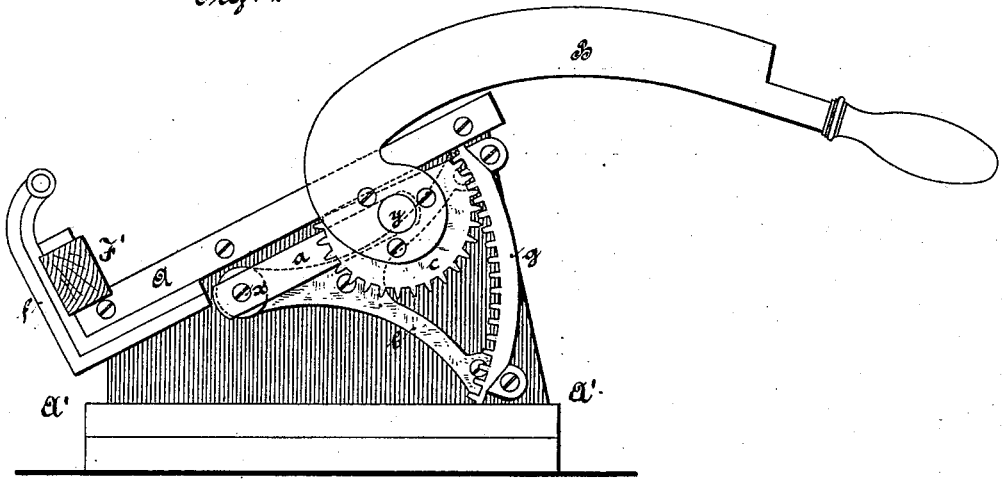
Figure 2:
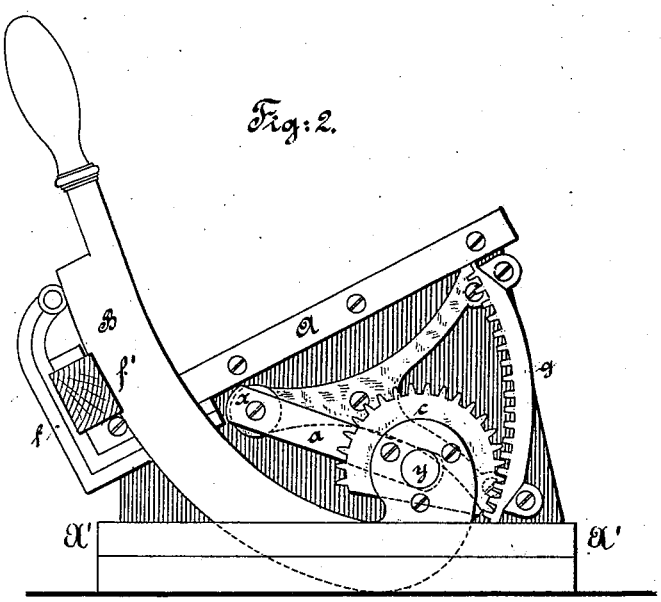

In the accompanying drawings, Figures 1 and 2 represent front elevations of my improved bread-cutting machine, showing the cutting-knife respectively in raised and lowered position.

Similar letters of reference indicate corresponding parts.

A in the drawings represents an inclined board, which is supported on a suitable base-block, A', and provided with a bread-guard, $f$, and knife-rest, $f'$, at the lower end, as usual in bread-cutting machines.

The knife B is provided at its outer end with a handle and pivoted at the opposite end at $y$ to a lever, $a$, said lever $a$ being pivoted at $x$ to the end of the base-block of the machine.

To the pivoted end of the knife B is rigidly attached, by means of screws, a toothed segment, $c$, that engages a segmental rack, $g$, that is screwed to the base-block A' by means of a frame, $b$. The knife B is curved, so that the cutting-edge is nearly always at right angles to the board A.

When the knife is moved from its raised position (shown in Fig. 1) into the lowered position, (represented by Fig. 2,) the knife B passes close to the metal-faced edge of the board A, while the toothed segment gears with the rack $g$ and lowers the pivot $y$ of the knife B, whereby a clean cut of the same is obtained even at those points of the cutting-edge near the pivot $y$, which was not the case in bread-cutting knives heretofore in use.

Having thus described my invention, I claim as new and desire to secure by Letters Patent—

1. In bread-cutting machines, the combination of a supporting base-block, A', a curved knife, B, an oscillating lever, $a$, pivoted to the knife and to the base-block, a toothed segment, $c$, secured to the knife B, and a segmental rack, $g$, attached to the end of the base-block, substantially as and for the purpose set forth.

2. The combination of an inclined board, A, having bread and knife rests $f f'$, base-block A', curved knife B, oscillating lever $a$, pivoted to the knife and base-block, toothed segment $c$, attached to the pivoted end of the knife, and fixed rack $g$, substantially as described.

In testimony whereof I have signed my name to this specification in the presence of two subscribing witnesses.

MAX SCHNEIDER.

Witnesses:
G. DITTMAR,
B. ROI.